United States Patent
Becerra et al.

(10) Patent No.: US 6,456,023 B1
(45) Date of Patent: Sep. 24, 2002

(54) METHOD AND APPARATUS TO CONTROL A VARIABLE SPEED MOTOR

(75) Inventors: Roger C. Becerra, Fort Wayne, IN (US); Dirk van der Duim, Harpswell, ME (US); Mark A. Brattoli, Fort Wayne, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,226

(22) Filed: Aug. 8, 2001

(51) Int. Cl.$^7$ ................................. H02P 3/08
(52) U.S. Cl. .................... 318/254; 318/439; 318/711; 236/DIG. 9; 236/49.1; 236/74 R; 236/91 D; 62/228.1; 62/228.4
(58) Field of Search ................. 318/700, 701, 318/711, 439, 254; 236/DIG. 9, 74 R, 91 D, 49.1; 62/228.1, 228.4

(56) References Cited

U.S. PATENT DOCUMENTS

| | | | | |
|---|---|---|---|---|
| 5,019,757 A | * | 5/1991 | Beifus ........................ | 318/254 |
| 5,220,255 A | * | 6/1993 | Alford ........................ | 318/254 |
| 5,397,970 A | * | 3/1995 | Rowlette et al. ............ | 318/254 |
| 5,410,230 A | * | 4/1995 | Bessler et al. .............. | 318/471 |
| 5,473,229 A | * | 12/1995 | Archer et al. ............... | 318/254 |
| 5,485,953 A | | 1/1996 | Bassett et al. | |
| 5,492,273 A | | 2/1996 | Shah | |
| 5,557,182 A | * | 9/1996 | Hollenbeck et al. ........ | 318/432 |
| 5,566,084 A | | 10/1996 | Cmar | |
| 5,590,642 A | | 1/1997 | Borgeson et al. | |
| 5,592,058 A | * | 1/1997 | Archer et al. ................ | 318/254 |
| 5,592,059 A | * | 1/1997 | Archer ........................ | 318/254 |
| 5,735,134 A | | 4/1998 | Liu et al. | |
| 5,772,501 A | | 6/1998 | Merry et al. | |
| 5,893,705 A | | 4/1999 | Khan et al. | |
| 5,994,869 A | * | 11/1999 | Becerra ...................... | 318/729 |
| 6,021,252 A | | 2/2000 | Faris et al. | |
| 6,048,263 A | | 4/2000 | Uchida et al. | |
| 6,073,987 A | | 6/2000 | Lindberg et al. | |
| 6,132,182 A | | 10/2000 | Khan et al. | |
| 6,202,012 B1 | | 3/2001 | Gile et al. | |
| 6,215,261 B1 | * | 4/2001 | Becerra ...................... | 318/254 |
| 6,256,557 B1 | | 7/2001 | Avila et al. | |
| 6,307,338 B1 | | 10/2001 | Kuner et al. | |

* cited by examiner

Primary Examiner—Robert E. Nappi
Assistant Examiner—Rina I. Duda
(74) Attorney, Agent, or Firm—Karl Vick, Esq.; Damian Wasserbauer, Esq.; Armstong Teasdale LLP

(57) ABSTRACT

A method for controlling an electronically commutated motor (ECM) using an air moving system including a controller and an interface board, the interface board electrically coupled to the controller. The ECM electrically coupled to the interface board. The ECM includes a motor controller having an ECM program and the interface board includes a mode signal circuit and a tap signal circuit. The method includes transmitting control signals to the interface board, translating the signals into signals suitable for controlling the ECM, and operating the ECM based on the translated signals.

27 Claims, 3 Drawing Sheets

METHOD AND APPARATUS TO CONTROL A VARIABLE SPEED MOTOR

BACKGROUND OF THE INVENTION

This invention relates generally to electronically commutated motors (ECMs), and more particularly, to methods and apparatus for controlling electronically commutated motors.

Some known blower motors are designed to operate at a single speed. However, due to the energy saving benefits of operation at low speed and the need to overcome high static pressures at high speed, blower motors included in air moving systems, such as heating, ventilation and air conditioning (HVAC) systems, often operate over a wide range of speeds. Therefore, since variable speed electronically commutated motors are more efficient than known standard induction motors, air moving systems, such as HVAC systems, often include ECMs. Typically, air moving system controller circuits operate at a different voltage level than the ECM, and an electrical interface is required for the controller to communicate with the ECM. Such interfaces typically control the ECMs using pulse width modulation (PWM) by continuously adjusting motor speed. Because such interfaces communicate using PWM, the interfaces are often complex and expensive.

SUMMARY OF INVENTION

In one aspect of the invention, a method is provided for controlling an electronically commutated motor (ECM) using an air moving system including a controller and an interface board, the interface board electrically coupled to the air moving system controller. The ECM electrically coupled to the interface board. The ECM includes a motor controller having an ECM program and the interface board includes a mode signal circuit and a tap signal circuit. The method includes transmitting control signals to the interface board, translating the signals into signals suitable controlling the ECM, and operating the ECM based on the translated signals.

In another aspect of the invention, a system is provided for controlling an ECM. The system comprises a controller, an interface board electrically connected to the controller, and an ECM electrically connected to the interface board. The system is configured to transmit control signals to the interface board, translate the signals into signals suitable for receipt by the ECM, and operate the ECM based on the translated signals.

In yet another aspect of the invention, an interface board is provided for controlling an ECM. The interface board electrically coupled to the ECM and a controller. The interface board comprises a mode signal circuit, a tap signal circuit, and a regulating circuit electrically connect to the mode signal circuit and the tap signal circuit. The interface board configured to receive control signals from a controller and translate the signals into signals suitable for controlling the ECM.

DETAILED DESCRIPTION

Figure 1:
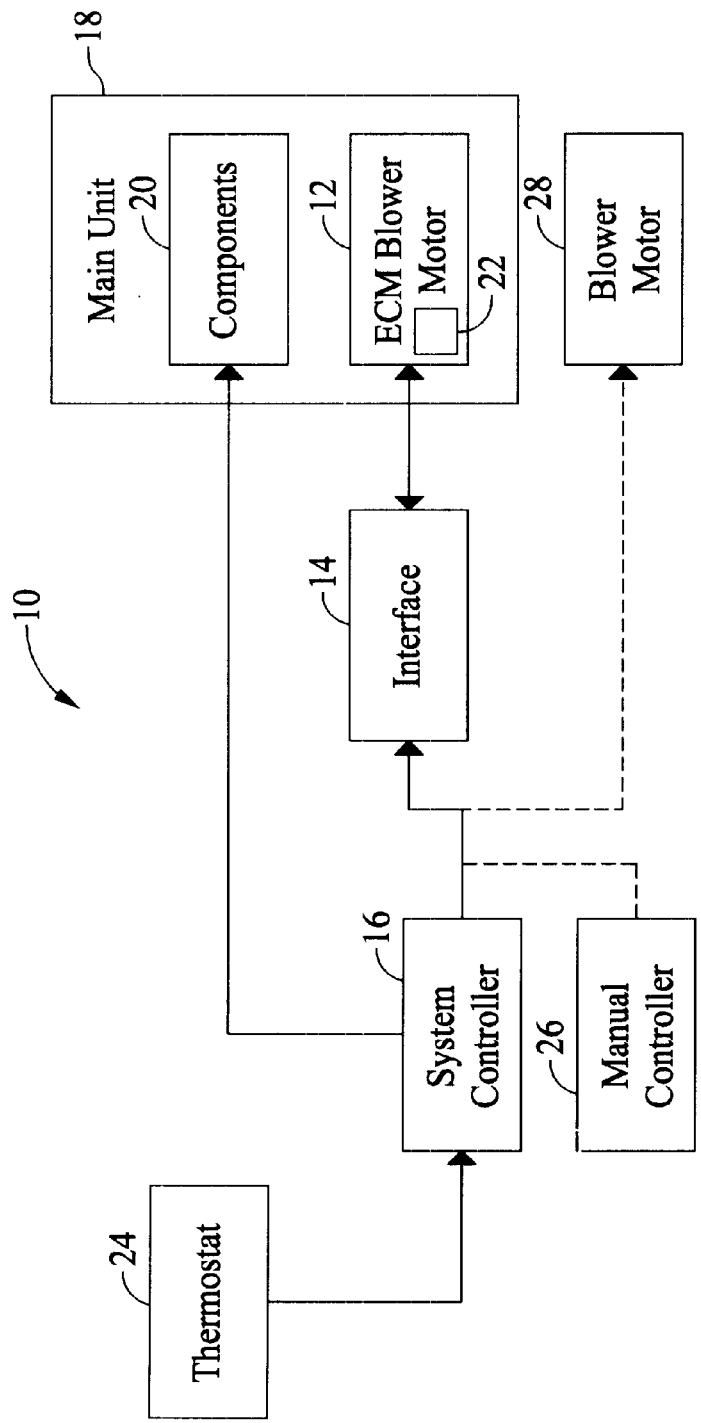
FIG. 1 is an exemplary block diagram of an air moving control system, used to control an electronically commutated motor.

FIG. 1 is a block diagram of an air moving control system 10 used to control an electronically commutated motor (ECM) 12. System 10 is an air moving control system, such as a residential heating, ventilation and air conditioning (HVAC) control system, a light industrial HVAC control system, or a clean room filtering control system. System 10 includes an interface circuit 14 electrically coupled to a system controller 16, for example a HVAC system controller, and a main unit 18, for example a HVAC unit. Main unit 18 includes components 20 and ECM 12. In one embodiment, ECM 12 is a blower motor. Motor 12 includes a motor controller 22 including a microprocessor (not shown) and a memory (not shown) containing an ECM program. In one embodiment, system controller 16 is connected to a thermostat 24. Thermostat 24 includes a plurality of settings, or modes, such as low heat, high heat, cooling, dehumidify, and continuous fan. Additionally, thermostat 24 measures a temperature in a predetermined space or location and transmits an electrical signal representing the measured temperature to controller 16. Controller 16 controls main unit 18 via interface circuit 14. Interface circuit 14 receives control signals in the form of input voltage signals from system controller 16 and translates the signals to signals suitable for controlling by ECM 12. The translated signals are transmitted to blower motor 12, and a torque of blower motor 12 is varied in accordance with the adjusted voltage outputs.

In an alternative embodiment, interface circuit 14 is not electrically connected to thermostat 24, but rather electrically connected to a manual controller 26 and an additional blower motor 28. When manual controller 26 and blower motor 28 are connected to interface circuit 14, a user is able to selectively operate blower motor 12 using an on/off switch. In such an embodiment, system controller 16 does not control blower motor 12 operation.

Figure 2:
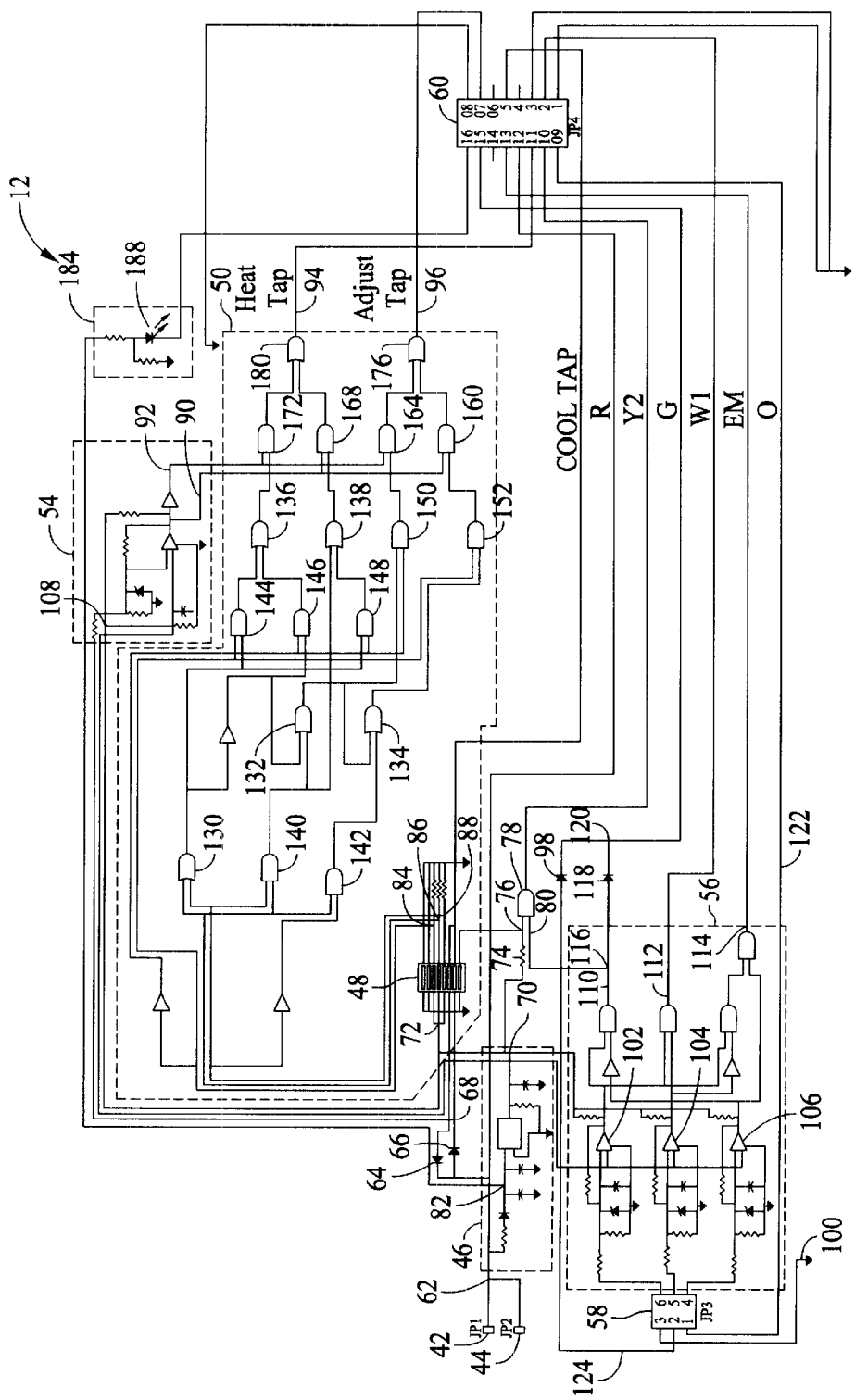
FIG. 2 is an electrical schematic of an electrical interface used with the control system shown in FIG. 1.

FIG. 2 is an electrical schematic of interface circuit 14 including input terminals 42 and 44, a voltage regulatory circuit 46, a single-pole-single-throw switch 48, a tap signal circuit 50, i.e. a digital logic circuit, a threshold comparison circuit 54, a mode signal circuit 56, i.e. a comparator circuit, and connectors 58 and 60. Input terminals 42 and 44 are connected to voltage regulatory circuit 46 at node 62. Node 62 is connected to diodes 64 and 66 and diode 64 is directly coupled to single-pole-single-throw switch 48. Diode 66 is coupled to node 68, which, in turn, is connected to single-pole-single-throw switch 48 and threshold comparison circuit 54. Input terminal 42 is also connected to connector 60.

Voltage regulatory circuit output 70 is connected to single-pole-single-throw switch 48 at node 72. Additionally, circuit output 70 is connected to a resistor 74 at node 76. Node 76 is also coupled to single-pole-single-throw switch 48 and an AND gate 78. An AND gate input 80 is connected to mode signal circuit 56, and output node 70 is connected to threshold comparison circuit 54. Voltage regulatory circuit 46 is connected at a node 82 to auxiliary indicator circuit 52 which, in turn, is connected to connector 60.

A plurality of outputs 84, 86, and 88 of single-pole-single-throw switch 48 are connected to tap signal circuit 50. Threshold comparison circuit outputs 90 and 92 are also connected to tap signal circuit 50. Tap signal circuit outputs 94 and 96 are connected to connector 60. Connector 58 is connected to connector 60, comparator circuit 56, diode 98, and terminal ground 100.

Voltage regulator output 70 is connected to three input lines of single-pole-single-throw switch 48 coupled at node 72. In one embodiment, switch 48 includes two lines electrically coupled to electrical ground. Lines 84, 86, and 88 are connected to tap signal circuit 50 such that one line is coupled to connector 60, and one line coupled to AND gate 78 input terminal at node 76. Switch 48 can be manually set by toggle switches to program switch 48 such that predetermined combination of voltage signals may be input to tap signal circuit 50. More specifically, nine combinations of signals can be input to tap signal circuit 50.

When controller 16 (shown in FIG. 1) is connected to thermostat 24 (shown in FIG. 1), motor 12 (shown in FIG. 1) uses thermostat control lines EM, W1, Y1, O, and G to switch between modes, i.e. low heat, high heat, cooling, dehumidify, and continuous fan. Desired torques and constants are then programmed into tables (not shown) included in motor controller 22 (shown in FIG. 1). Furthermore, HEAT, COOL, and ADJUST taps, and a Y2 line are used to select between the different torque values contained in the tables, thereby yielding different air flows in the application.

For example, if cooling mode line Y2 is activated, a combination of the COOL tap setting and cooling mode line Y2 determine an amount of torque applied to motor 12. The dehumidify mode is triggered when motor 12 is selected to be in a cooling mode and line O is activated. An amount of torque depends on the specific setting for the cooling mode. The continuous fan mode is triggered when line G is activated and no other signals are present. Then the torque level is determined solely by the position of the COOL tap. The low heat mode is activated using line EM, and the torque output is selected by the HEAT and ADJUST taps. The high heat mode uses the HEAT and ADJUST taps to select torque, and is activated by line W.

Mode signal circuit 56 includes a plurality of comparators 102, 104, and 106, connected at node 108. Node 108 is also connected to threshold comparison circuit 54. Mode signal circuit 56 has three outputs 110, 112, and 114. Output 110 is connected to a node 116 that is connected to AND input 80. Node 116 is also connected to diode 118. Diode 118 is connected to node 120. Node 120 connects diodes 98 and 118 to connector 60. Outputs 112 and 114 are connected to connector 60. Positive half-wave rectified 24 VAC signals are sent to inputs 42 and 44 and the voltage is regulated by voltage regulatory circuit 46 such that a continuous and stable voltage is supplied to mode signal circuit 56.

Circuit 56 is a combinational logic circuit that provides desired outputs that are then sent directly to motor 12. Line 122 extends to connector 60, and triggers the dehumidify mode when 24 VAC is present and line Y2 is activated. Diodes 98 and 118 function as an OR gate for an input line 124 and output 110, which is necessary because the same control line to connector 60 is used for both input 124 and output 110. A 24 VAC signal is rectified by diode 98 such that a positive half-wave signal is transmitted on line G to trigger motor 12 to enter into the continuous fan mode. If output 110 is high, then line G is high continuously and the cool of dehumidify mode is triggered.

Tap signal circuit 50 controls an airflow setting or taps of system 10 (shown in FIG. 1). Tap signal circuit 50 includes single-pole-single-throw switch 48, which includes a plurality of dual in-line package (DIP) switches. Additionally tap signal circuit 50 includes logic circuitry, which includes OR gates 130, 132, 134, 136 and 138, and AND gates 140, 142, 144, 146, 148, 148, 150 and 152. The logic circuitry interprets the settings of switch 48 and transmits a desired output to motor 12. The COOL tap output uses two DIP switches within switch 48 to generate a appropriate combination of negative and positive 24V half-wave AC signals. For the ADJUST and HEAT taps, to select a tap either no voltage, a square wave in phase with AC input 42, a square wave 180 degrees out of phase with AC input 42, or constant voltage is provided to the tap.

In-phase and out-of-phase square waves are generated using comparator circuitry that is included in tap signal circuit 50. The square waves are sent to AND gates 160, 164, 168 and 172. AND gates 160, 164, 168 and 172 also receive a continuous "on" or "off" output signal from a logic circuit (not shown). Outputs from AND gates 160, 164, 168 and 172 are sent to OR gates 176 and 180, for controlling outputs 94 and 96. For example, to generate a HEAT tap with a square wave that is 180 degrees out of phase with AC input 42, pin 2 of AND gate 172 is held high continuously, and pin 6 of AND gate 168 is held low continuously. Thus, an out-of-phase square wave at the HEAT tap would be yielded and ECM 12 is signaled to use the appropriate torque setting for the low or high heat modes.

In another embodiment, interface circuit 14 includes an auxiliary indicator, or feedback, circuit 184 that includes an LED 188 connected to an auxiliary output (not shown) of ECM 12. ECM 12 is programmed to use the auxiliary output to indicate motor torque. ECM 12 contains an optocoupler (not shown), which is activated when an output pulse is desired. As a result, the cathode of LED 188 is grounded, causing LED 188 to illuminate. More specifically, the program indicates torque by groups of blinks, i.e. one blink for every three ounce-feet of torque. For example, a torque of 15 oz.-ft. would cause LED 188 to blink five times in succession, then a pause, then five more blinks in succession, and so on.

Figure 3:
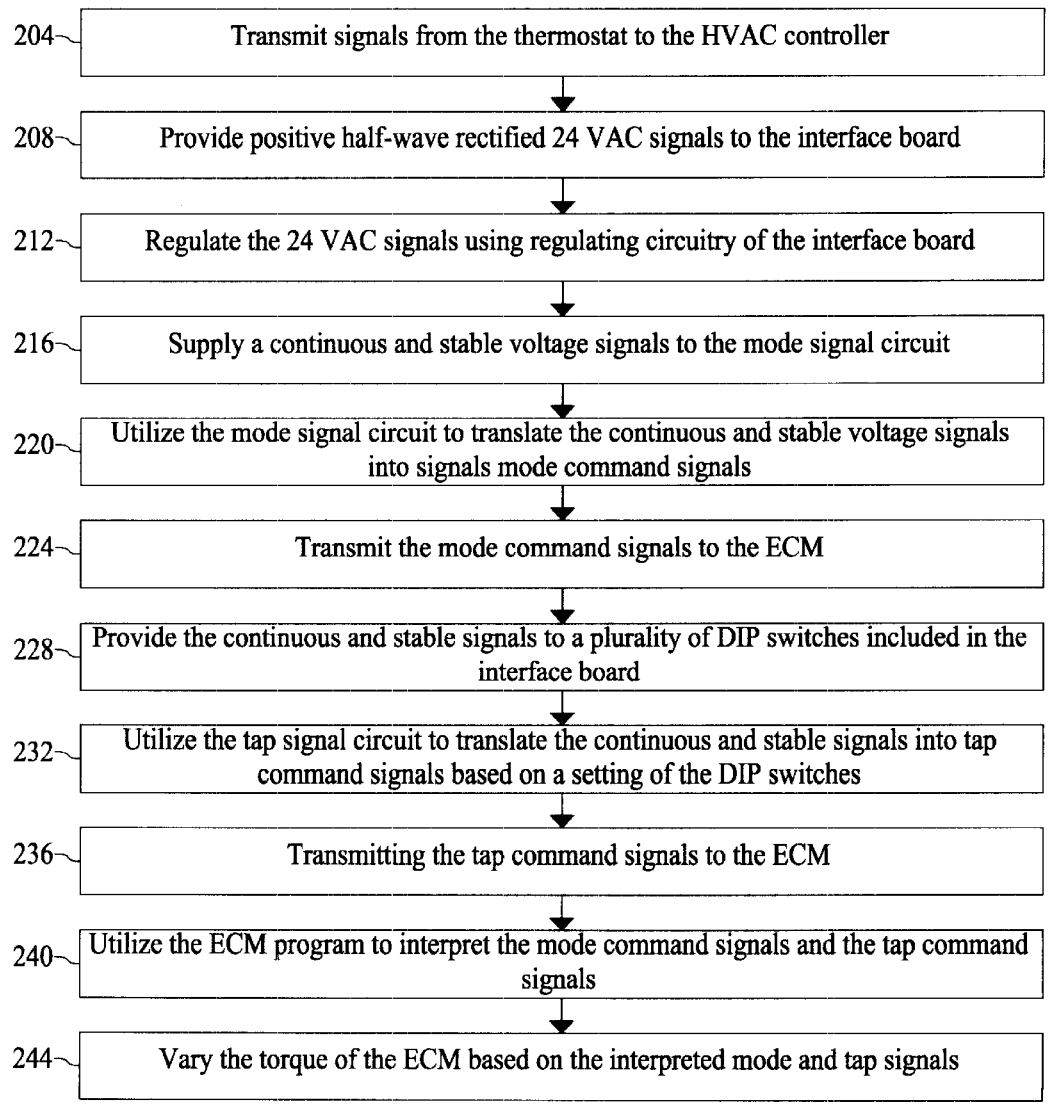
FIG. 3 is flow chart illustrating an operation of the air moving control system, shown in FIG. 1.

FIG. 3 is a flow chart 200 of illustrating an operation of system 10, shown in FIG. 1. In an exemplary embodiment a thermostat monitors a temperature within a specific space or location and transmits 204 signals to the controller representing the monitored temperature. The controller then provides 208 positive half-wave rectified 24 VAC signals to the inputs of the interface board, whereby the signals are regulated 212 by a voltage regulating circuit of the interface. By regulating the voltage signals, continuous and stable voltage signals are supplied 216 to the mode signal circuit. The mode signal circuit translates 220 the continuous and stable voltage signals into signals mode command signals and transmits 224 the adjusted mode command signals to an ECM. The tap signal circuit includes a switch including a plurality of dual-in-line package (DIP) switches. In addition to providing regulated signals to the mode signal circuit, the regulating circuit provides 228 continuous and stable signals to the tap signal circuit switch. Based on the settings of the DIP switches, the tap signal circuit translates 232 the continuous and stable signals into tap command signals, and transmits 236 the tap command signals to the ECM. Upon receipt of the mode command signals and the tap command signals, the motor controller utilizes tables stored in the motor controller and the ECM program to interpret 240 the mode and tap command signals, thus varying 244 an amount of torque of the ECM accordingly.

While the invention has been described in terms of various specific embodiments, those skilled in the art will recognize that the invention can be practiced with modification within the spirit and scope of the claims.

What is claimed is:

1. A method for controlling an electronically commutated motor (ECM) using an air moving system, the system including a controller and an interface board, the interface board electrically coupled to the controller, the ECM electrically coupled to the interface board and including a motor controller having an ECM program, the interface board including a mode signal circuit and a tap signal circuit, said method comprising:

transmitting control signals to the interface board;

providing the control signals as positive half-wave rectified 24 VAC signals to the interface board;

regulating the half-wave rectified 24 VAC control signals;

translating the control signals into signals for controlling the ECM; and operating the ECM based on the translated signals.

2. A method in accordance with claim 1 wherein the system further includes a thermostat, transmitting control signals to the interface board comprises:

transmitting signals from the thermostat to the controller; and transmitting control signals from the controller to the interface board.

3. A method in accordance with claim 1 wherein regulating the half-wave rectified 24 VAC control signals comprises:

providing continuous and stable voltage signals to the mode signal circuit.

4. A method in accordance with claim 3 wherein translating the control signals further comprises:

utilizing the mode signal circuit to translate the continuous and stable voltage signals into mode command signals; and transmitting the mode command signals to the ECM.

5. A method in accordance with claim 4 wherein the tap signal circuit includes a switch including a plurality of dual-in-line package (DIP) switches, regulating the half-wave rectified 24 VAC control signals further comprises providing the continuous and stable signals to the switch.

6. A method in accordance with claim 5 wherein translating the control signals further comprises:

utilizing the tap signal circuit to translate the continuous and stable signals into tap command signals based on a setting of the DIP switches; and transmitting the tap command signals to the ECM.

7. A method in accordance with claim 6 wherein operating the ECM based on the translated signals comprises:

utilizing the ECM program to interpret the mode command signals;

utilizing the ECM program to interpret the tap command signals; and controlling a torque of the ECM based on the interpreted mode and tap signals.

8. A method in accordance with claim 1 wherein the interface board further includes an auxiliary indicator circuit including a light emitting diode (LED), operating the ECM further comprises pulsing the LED to indicate a torque output of the ECM.

9. A method in accordance with claim 1 wherein the system further includes a manual controller electrically coupled to the interface board, transmitting control signals to the interface board comprises transmitting control signals from the manual controller to the interface board.

10. A system for controlling an electronically commutated motor (ECM), said system comprising:

an air moving system controller;

an interface board electrically coupled to said controller, said interface board comprising a regulating circuit configured to regulate 24 VAC signals and provide continuous and stable signals to said interface board; and an ECM electrically connected to said interface board.

11. A system in accordance with claim 10 wherein said system further comprises a thermostat configured to monitor a temperature in a specified space and transmit signals to said controller based on the monitored temperature.

12. A system in accordance with claim 10 wherein said controller configured to provide positive half-wave 24 VAC signals to said interface board based on the signals received from said thermostat.

13. A system in accordance with claim 10 wherein said interface board comprises a mode signal circuit and a tap signal circuit, said regulating circuit further configured to provide continuous and stable voltage signals to said mode signal circuit.

14. A system in accordance with claim 13 wherein said ECM comprises a motor controller, said motor controller comprising an ECM program, said mode signal circuit configured to translate the continuous and stable voltage signals into mode command signals, and transmit the mode command signals to said motor controller.

15. A system in accordance with claim 13 wherein said tap signal circuit comprises a switch comprising a plurality of dual in-line package (DIP) switches, said regulating circuit further configured to provide continuous and stable voltage signals to said switch.

16. A system in accordance with claim 15 wherein said tap signal circuit configured to translate the continuous and stable voltage signals into tap command signals based on a setting of said DIP switches, said tap signal circuit further configured to transmit the tap command signals to said motor controller.

17. A system in accordance with claim 14 wherein said motor controller configured to utilize said ECM program to interpret the mode command signals and the tap command signals, and control the torque of said ECM based on the interpretation of the mode and tap command signals.

18. A system in accordance with claim 10 wherein said system further comprises a manual controller electrically coupled to said interface board, said manual controller configured to transmit signals to said interface board for controlling said ECM.

19. A system in accordance with claim 10 wherein said interface board further comprises an auxiliary indicator circuit comprising a light emitting diode (LED), said auxiliary indicator circuit configured to pulse said LED to indicate a torque output of said ECM.

20. A system in accordance with claim 10 wherein said air moving system controller is a heating, ventilation and air conditioning system controller.

21. An interface board for controlling an electronically commutated motor (ECM), said interface board electrically coupled to the ECM and a controller, said interface board comprising:

a mode signal circuit;

a tap signal circuit; and a regulating circuit electrically coupled to said mode signal circuit and said tap signal circuit, said tap signal circuit comprising a switch having a plurality of DIP switches, said regulating circuit configured to provide continuous and stable voltage signals to said switch.

22. An interface board in accordance with claim 14 wherein the controller is an air moving system controller, said interface board configured to receive positive half-wave 24 VAC signals from the controller.

23. An interface board in accordance with claim 14 wherein said regulating circuit configured to regulate 24 VAC signals and provide continuous and stable voltage signals to said mode signal circuit.

24. An interface board in accordance with claim 21 wherein the ECM includes a motor controller, said mode signal circuit configured to translate continuous and stable voltage signals into mode command signals, and transmit the mode command signals to the motor controller.

25. An interface board in accordance with claim 21 wherein said tap signal circuit configured to translate continuous and stable voltage signals into tap command signals based on a setting of said DIP switches, said tap signal circuit further configured to transmit the tap command signals to the motor controller.

26. An interface board in accordance with claim 21, wherein said controller is a manual controller, said interface board configured to receive control signals from the manual controller for controlling the ECM.

27. An interface board in accordance with claim 21 further comprising an auxiliary indicator circuit including a light emitting diode (LED), said auxiliary indicator circuit configured to pulse said LED to indicate a torque output of the ECM.

* * * * *

UNITED STATES PATENT AND TRADEMARK OFFICE
CERTIFICATE OF CORRECTION

PATENT NO. : 6,456,023 B1 Page 1 of 1
DATED : September 24, 2002
INVENTOR(S) : Becerra et al.

It is certified that error appears in the above-identified patent and that said Letters Patent is hereby corrected as shown below:

Column 6,
Lines 60 and 64, delete "14" and insert therefor -- 21 --.

Signed and Sealed this

Nineteenth Day of October, 2004

JON W. DUDAS
*Director of the United States Patent and Trademark Office*